United States Patent
Yasunaga

(10) Patent No.: US 11,567,095 B2
(45) Date of Patent: Jan. 31, 2023

(54) SAMPLE RACK

(71) Applicant: Shimadzu Corporation, Kyoto (JP)

(72) Inventor: Kenichi Yasunaga, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 298 days.

(21) Appl. No.: 16/958,996

(22) PCT Filed: Jan. 11, 2018

(86) PCT No.: PCT/JP2018/000391
§ 371 (c)(1),
(2) Date: Jun. 29, 2020

(87) PCT Pub. No.: WO2019/138478
PCT Pub. Date: Jul. 18, 2019

(65) Prior Publication Data
US 2020/0333368 A1    Oct. 22, 2020

(51) Int. Cl.
*G06F 7/00* (2006.01)
*G01N 35/04* (2006.01)
*G01N 35/00* (2006.01)

(52) U.S. Cl.
CPC ... *G01N 35/04* (2013.01); *G01N 2035/00346* (2013.01); *G01N 2035/0422* (2013.01)

(58) Field of Classification Search
CPC ......... G01N 35/04; G01N 2035/00346; G01N 2035/0422; G01N 2035/0425; G01N 1/10
USPC ..... 73/863, 863.11, 863.52, 863.81; 700/213
See application file for complete search history.

(56) References Cited

U.S. PATENT DOCUMENTS

| | | | |
|---|---|---|---|
| 2003/0032191 A1* | 2/2003 | Hilson | G01N 35/04 435/6.1 |
| 2017/0315030 A1* | 11/2017 | Kubota | G02B 21/34 |
| 2020/0072855 A1* | 3/2020 | Oda | G01N 35/00871 |

OTHER PUBLICATIONS

International Search Report dated Apr. 17, 2018, for PCT application PCT/JP2018/000391, submitted with a machine translation.

* cited by examiner

*Primary Examiner* — Yolanda R Cumbess
(74) *Attorney, Agent, or Firm* — Muir Patent Law, PLLC

(57) ABSTRACT

A sample rack includes a placement table having an upper surface for placing at least one sample plate thereon, a handle portion holding a proximal end portion of the placement table, the handle portion having a lower end portion positioned lower than a lower surface of the placement table when the upper surface is leveled, and a leg portion attached to the placement table to take a protruding posture in which the leg portion is protruded downward from the lower surface and a storage posture in which the leg portion is not protruded downward from the lower surface. The leg portion is configured to support the sample rack to maintain the upper surface substantially horizontally in cooperation with the lower end portion of the handle portion when the sample rack is placed on a substantially horizontal surface with the leg portion taking the protruding posture.

7 Claims, 4 Drawing Sheets

SAMPLE RACK

TECHNICAL FIELD

The present invention relates to a sample rack for an autosampler.

BACKGROUND OF THE INVENTION

Some autosamplers for a liquid chromatograph include a sample storage for storing samples held by a sample plate while adjusting the temperature of the sample (see Patent Document 1). When storing a sample plate in a sample storage, the sample plate is mounted on a sample rack, and the sample rack is inserted into the sample storage from a rack insertion opening provided in the sample storage.

PRIOR ART DOCUMENT

Patent Document

Patent Document 1: Japanese Unexamined Patent Application Publication No. 2016-176749

SUMMARY OF THE INVENTION

Problems to be Solved by the Invention

The temperature in a sample storage is controlled by a heater, a Peltier element, or the like. Particularly, in cases where the temperature control is performed while cooling the inside of the sample storage, since condensation is likely to occur when the outside air enters the sample storage, the airtightness of the rack insertion opening after inserting the sample rack from the rack insertion opening to store the sample plate in the sample storage is critical.

To ensure the airtightness of the rack insertion opening after installing the sample plate in the sample storage, it is necessary to configure such that a packing is provided on a handle portion provided at the proximal end of the sample rack so that the packing of the handle portion is brought into contact with the periphery of the edge of the rack insertion opening when the sample rack is inserted into the rack insertion opening from the front end side.

However, such a structure requires the handle portion of the sample rack to be greater than the rack insertion opening, which necessarily results in a downwardly protruded state of the handle portion with respect to the sample rack. When such a sample rack is drawn out from the rack insertion opening and arranged on a horizontal desk, the handle portion located at the proximal end of the sample rack protrudes downward, so that the sample rack is inclined obliquely, and the horizontal posture cannot be maintained. Mounting a sample plate on the sample rack in such a condition is poor in workability. Further, in cases where the sample plate is a microwell plate, when a microwell plate containing a large amount of liquid in the wells is mounted on the sample rack, there is a risk that the microwell plate becomes oblique and the liquid in the wells is spilled.

Under the circumstances, the present invention aims to enable to hold a sample rack drawn out from a sample storage substantially horizontally.

Means for Solving the Problem

The sample rack according to the present invention is a sample rack configured to be inserted into a sample storage. The sample rack includes: a placement table having an upper surface for placing at least one sample plate thereon; a handle portion holding a proximal end portion of the placement table, the handle portion having a lower end portion positioned lower than a lower surface of the placement table when the upper surface of the placement table is leveled; and a leg portion attached to the placement table and configured to take a protruding posture in which the leg portion is protruded downward from the lower surface of the placement table and a storage posture in which the leg portion is not protruded downward from the lower surface of the placement table. The leg portion is configured to support the sample rack to maintain the upper surface of the placement table substantially horizontally in cooperation with the lower end portion of the handle portion when the sample rack is placed on a substantially horizontal surface in a state in which the leg portion takes the protruding posture.

In a preferred embodiment, the sample rack further includes: an elastic member configured to bias the leg portion in a direction to make the leg portion protrude from the lower surface of the placement table so that the leg portion takes the protruding posture when no external force acts on the leg portion. When a stress acts on the leg portion from a front end side of the placement table toward a proximal end side thereof, the leg portion is configured to take the storage posture by the stress. By configuring as described above, when the sample rack is drawn out from the sample storage, the leg portion automatically takes the protruding posture by the elastic force of the elastic member. On the other hand, when inserting the sample rack into the rack insertion opening of the sample storage, the edge, etc., of the insertion opening is brought into contact with the leg portion, causing a stress to act on the leg portion from the front end side of the placement table toward the proximal end side thereof, so that the leg portion automatically takes the storage posture in accordance with the insertion action of the sample rack into the rack insertion opening. This eliminates the need for any additional action to store the leg portion when inserting the sample rack into the rack insertion opening.

As a preferred embodiment, it can be exemplified in which when the sample rack is inserted into the sample storage, the leg portion takes the storage posture, so that the lower surface of the placement table comes into contact with a base configured to be cooled or heated in the sample storage to cool or heat the sample plate, and when the sample rack is drawn out from the sample storage, the leg portion is configured to take the protruding posture.

As a preferred embodiment, it can be exemplified in which the sample rack further includes a packing attached to a peripheral edge of a placement table side surface of the handle portion. The packing is configured to keep airtightness of the rack insertion opening provided in a front panel of the sample storage by coming into contact with the front panel in a state in which the sample rack is inserted into the sample storage.

As an example of the leg portion, it can be exemplified in which the leg portion includes a main leg, an auxiliary leg, and a torsion spring that is an elastic member. In this case, one end of the main leg is connected to the placement table by a first shaft and is rotatable within a vertical plane about the first shaft, and the other end of the main leg and one end of the auxiliary leg are connected by a second shaft and are rotatable mutually in a vertical plane with the second shaft as a rotation axis. The other end of the auxiliary leg is connected to a slide shaft slidably provided along a guide rail provided on the placement table so as to extend in a direction parallel to the upper surface of the placement table In the above-described case, the torsion spring may be provided so that one end side of the torsion spring is in contact with a first protrusion provided to the placement table and the other end side thereof is in contact with a second protrusion provided to the main leg so that an elastic force always acts on the main leg in a direction to open the main leg toward the front end side of the placement table, and when the main leg is rotated to a predetermined position by the elastic force of the torsion spring, the slide shaft reaches a termination portion of the guide rail, and the termination portion position of the guide rail is set such that the leg portion takes the protruding posture when the slide shaft reaches the termination portion of the guide rail.

Further, it may be configured such that when the sample rack is inserted into the sample storage from the front end side of the placement table, the front panel of the sample storage is brought into contact with the auxiliary leg and exerts a stress on the auxiliary leg toward the proximal end side of the placement table, causing the auxiliary leg to slide toward the proximal end side of the placement table by the stress, so that the other end of the main leg is rotated toward the proximal end side of the placement table.

Effects of the Invention

The sample rack of the present invention is provided with a leg portion configured to take one of a protruding posture protruded downward to be lower than the lower surface of the placement table and a storage posture not protruded downward to be lower than the lower surface of the placement table, and is configured such that when the sample rack is placed on a substantially horizontal surface with the leg portion in the protruding posture, the leg portion supports the sample rack in cooperation of the lower end portion of the handle portion to maintain the upper surface of the placement table substantially horizontal. Therefore, the sample rack drawn out from the sample storage can be held substantially horizontally. This improves the workability when mounting a sample plate on the sample rack. Further, it is possible to avoid the risk that the sample plate mounted on the sample rack is inclined to cause the spillage of the sample plate liquid.

EMBODIMENTS FOR CARRYING OUT THE INVENTION

An embodiment of a sample rack according to the present invention will be explained with reference to the attached drawings.

Figure 1:
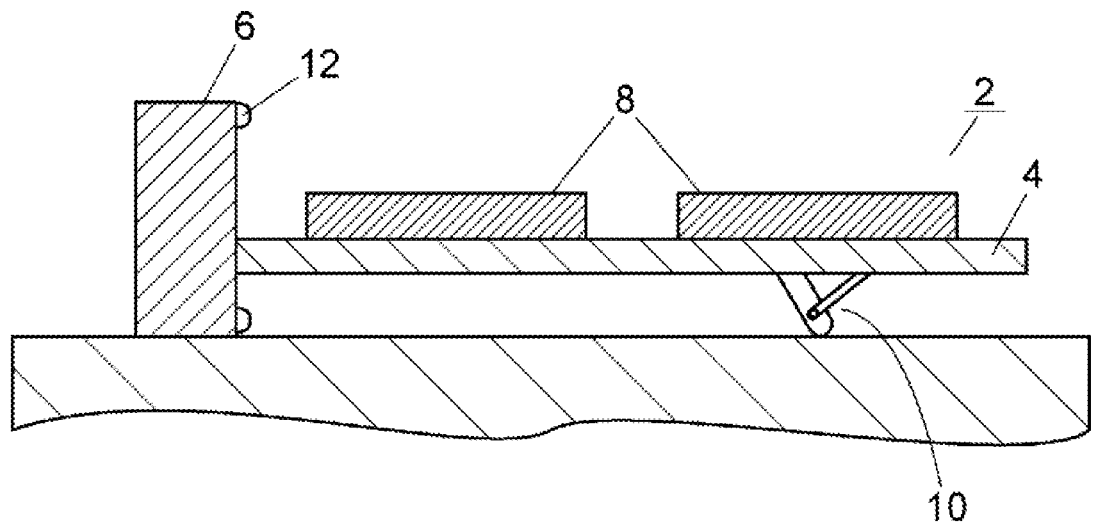
FIG. 1 is a cross-sectional view showing an embodiment of a sample rack.

As shown in FIG. 1, the sample rack 2 is provided with a placement table 4 having an upper surface for placing a sample plate 8 thereon, a handle portion 6 holding a proximal end portion (the left end in the drawings) of the placement table 4, and a leg portion 10 provided on the lower surface side of the placement table 4 for supporting the placement table 4. In this embodiment, although two sample plates 8 are placed on the placement table 4, it may be configured to be able to place one or three or more sample plates 8.

Figure 2:
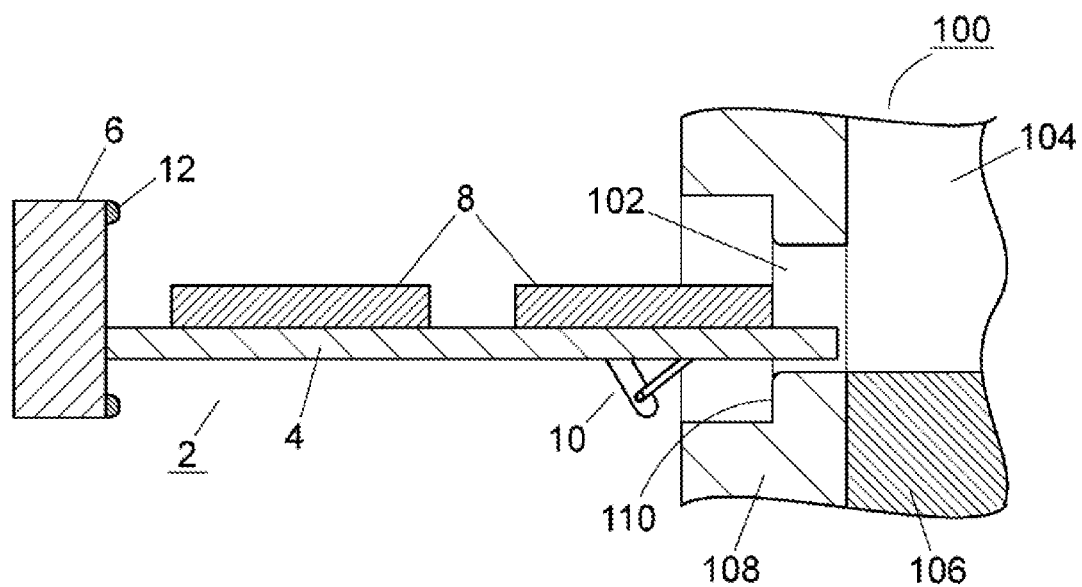
FIG. 2 is a cross-sectional view showing a state immediately before the insertion of the sample rack of the embodiment into the rack insertion opening of the sample storage.
Figure 3:
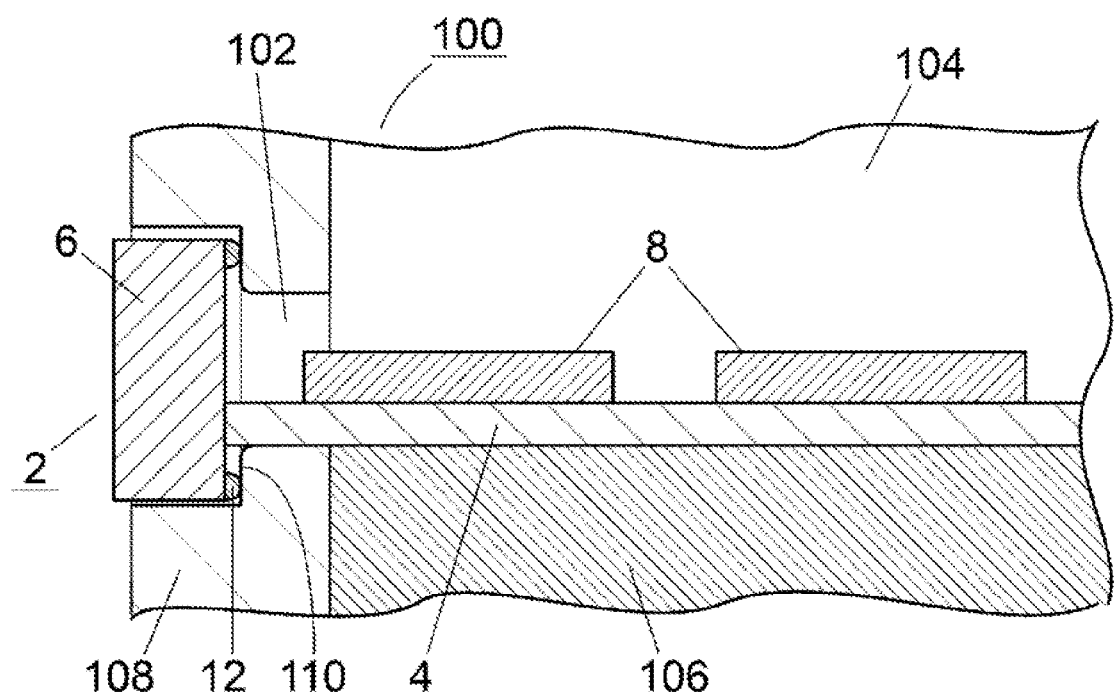
FIG. 3 is a cross-sectional view showing the sample rack of the embodiment inserted into the rack insertion opening of the sample storage.

As shown in FIG. 2 and FIG. 3, the sample rack 2 is for inserting the placement table 4 from the front end side into the sample storage 100 with sample plates 8 placed on the placement table 4 and for storing the sample plate 8 in the storage space 104. A rack insertion opening 102 is provided on the side surface of the sample storage 100 on which a front panel 108 is provided, and the sample plate 8 is stored in the storage space 104 in the sample storage 100 by inserting it into the rack insertion opening 102 from the distal end of the placement table 4.

When inserting the placement table 4 into the storage space 104 via the rack insertion opening 102, the leg portion 10 is stored on the placement table 4 side, so that the lower surface of the placement table 4 is brought into contact with the base 106 in the sample storage 100. The base 106 in the sample storage 100 is configured to be heated or cooled by a heater, a Peltier element, etc., so that when the placement table 4 is brought into direct contact with the base 106, it is possible to adjust the temperature of the sample plate 8 highly efficiently. The configuration of the leg portion 10 will be described later.

A packing 12 is provided on the periphery of the placement table 4 side surface of the handle portion 6. When the sample rack 2 is fully inserted into the rack insertion opening 102 of the sample storage 100, the packing 12 of the handle portion 6 is brought into contact with the periphery 110 of the rack insertion opening 102 of the front panel 108 to keep the airtightness of the rack insertion opening 102.

As described above, the sample rack 2 is structured to seal the rack insertion opening 102 by pressing the packing 12 of the handle portion 6 against the periphery 110 of the edge of the rack insertion opening 102, and therefore the lower end portion of the handle portion 6 protrudes downward to be lower than the lower surface of the placement table 4. When the sample rack 2 is drawn out from the rack insertion opening 102 of the sample storage 100, the leg portion 10 takes the protruding posture in which the leg portion 10 protrudes downward to be lower than the lower surface of the placement table 4. When the sample rack 2 is placed on a substantially horizontal plane, the placement table 4 is supported by the lower end portion of the handle portion 6 and the leg portion 10, so that the upper surface of the placement table 4 is kept substantially horizontal.

An example of a structure of the leg portion 10 will be described with reference to FIG. 4A, FIG. 4B, and FIG. 4C.

Figure 4A:
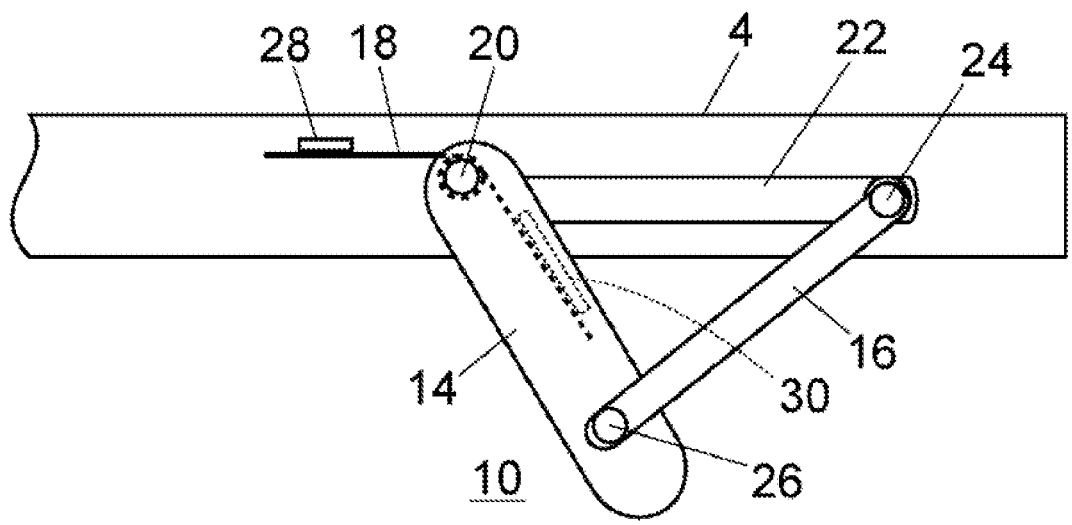
FIG. 4A is a diagram showing an example of a configuration of a leg portion of the sample rack of the embodiment.

As shown in FIG. 4A, the leg portion 10 is provided with the main leg 14, the auxiliary leg 16, and the torsion spring 18 (elastic member). One end of the main leg 14 is connected to the placement table 4 by a shaft 20 (first shaft) and is rotatable within a vertical plane about the shaft 20. The other end of the main leg 14 and one end of the auxiliary leg 16 are connected by a shaft 26 (second shaft). The main leg 14 and the auxiliary leg 16 are rotatable relative to each other within a vertical plane with the shaft 26 as a rotation axis.

The other end of the auxiliary leg 16 is attached to a slide shaft 24 which is slidably provided along the guide rail 22 provided on the placement table 4. The guide rail 22 is provided so as to extend in a direction parallel to the upper surface of the placement table 4.

The torsion spring 18 has one end side in contact with a protrusion 28 (first protrusion) provided on the placement table 4 and the other end side in contact with the protrusion 30 (second protrusion) provided on the main leg 14, and is provided so as to always apply an elastic force in a direction (counterclockwise in the drawing) in which the main leg 14 opens to the front end side of the placement table 4. That is, the main leg 14 is biased by the torsion spring 18 to rotate toward the front end side of the placement table 4. When the main leg 14 is rotated to a predetermined position by the elastic force of the torsion spring 18, the slide shaft 24 reaches the termination portion of the guide rail 22. The position of the termination portion of the guide rail 22 is set so that the leg portion 10 takes the protruding posture in which the leg portion 10 keeps the upper surface of placement table 4 substantially horizontally when the slide shaft 24 has reached the termination portion of the guide rail 22.

Figure 4B:
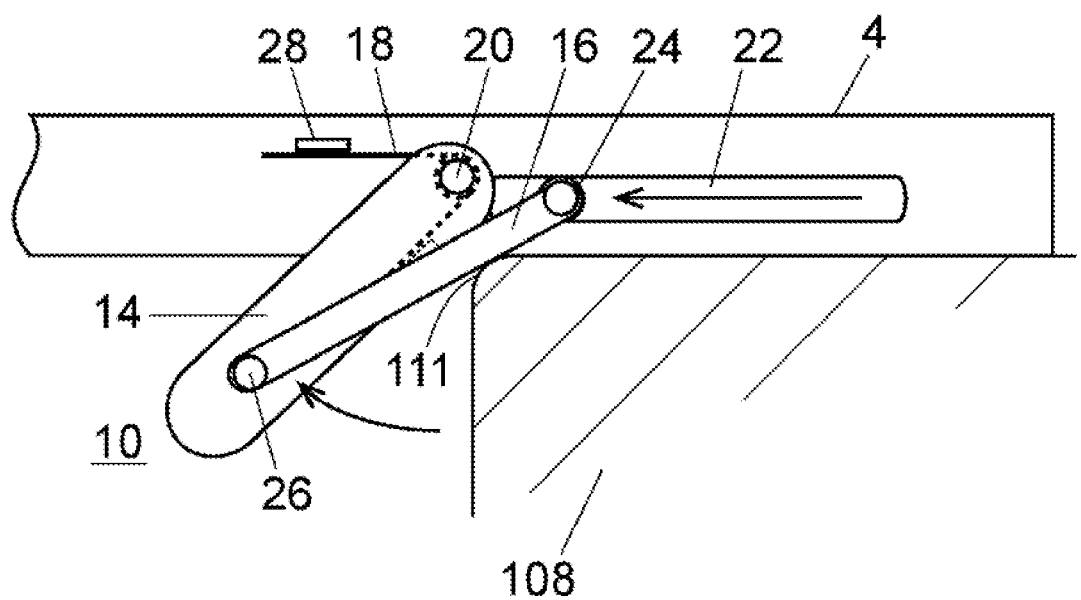
FIG. 4B is a diagram showing a state of a leg portion in the middle of inserting the sample rack of the embodiment into a rack insertion opening of a sample storage.

As shown in FIG. 4B, when the placement table 4 is inserted from the front end side into the rack insertion opening 102 of the sample storage 100 (see FIG. 2), the edge 111 of the rack insertion opening 102 of the front panel 108 is brought into contact with the auxiliary leg 16 and exerts a stress on the auxiliary leg 16 toward the proximal end side of the placement table 4. With this stress, the auxiliary leg 16 slides toward the proximal end side of the placement table 4, which causes the other end of the main leg 14 to rotate in a direction toward the proximal end side of the placement table 4 (clockwise in the drawing).

Figure 4C:
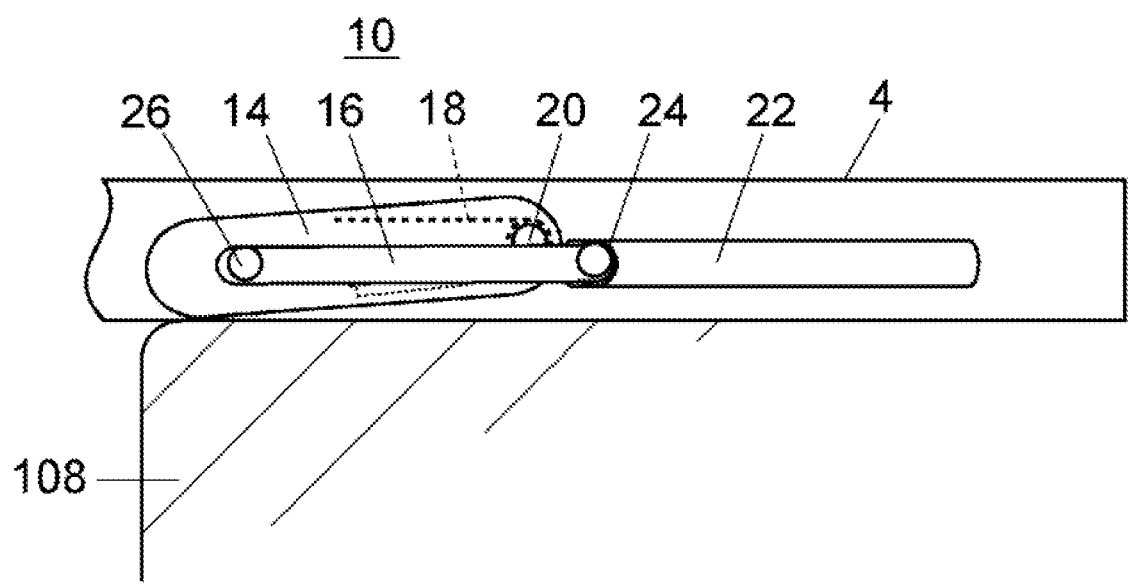
FIG. 4C is a diagram showing a state of a leg portion when the sample rack of the embodiment is inserted into a rack insertion opening of a sample storage.

When the placement table 4 is further inserted into the back of the rack insertion opening 102, the other end of the main leg 14 is lifted by the stress from the front panel 108, as shown in FIG. 4C, and becomes a state in which the main leg is stored in the placement table 4 (storage posture). Since the main leg 14 is biased counterclockwise by the torsion spring 18, the main leg 14 automatically takes the protruding posture by the elastic force of the torsion spring 18 when it is drawn out from the rack insertion opening 102.

Note that the present invention is not limited to the above embodiment, and the same function may be realized by other configurations. For example, in the above-described embodiment, although the torsion spring 18 is used as a mechanism for automatically shifting the leg portion 10 from the storage posture to the protruding posture, the mechanism may be changed to a mechanism using a coiled spring, a leaf spring, or the like.

DESCRIPTION OF SYMBOLS

2: Sample rack
4: Placement table
6: Handle portion
8: Sample plate
10: Leg portion
12: Packing
14: Main leg
16: Auxiliary leg
18: Torsion spring (elastic member)
20, 24, 26: Shaft
28, 30: Protrusion

The invention claimed is:

1. A sample rack configured to be inserted into a sample storage, comprising:
 a placement table having an upper surface for placing at least one sample plate thereon;
 a handle portion holding a proximal end portion of the placement table, the handle portion having a lower end portion positioned lower than a lower surface of the placement table when the upper surface of the placement table is leveled; and
 a leg portion attached to the placement table and configured to take a protruding posture in which the leg portion is protruded downward from the lower surface of the placement table and a storage posture in which the leg portion is not protruded downward from the lower surface of the placement table,
 wherein the leg portion is configured to support the sample rack to maintain the upper surface of the placement table substantially horizontally in cooperation with the lower end portion of the handle portion when the sample rack is placed on a substantially horizontal surface in a state in which the leg portion takes the protruding posture.

2. The sample rack as recited in claim 1, further comprising:
 an elastic member configured to bias the leg portion in a direction to make the leg portion protrude from the lower surface of the placement table so that the leg portion takes the protruding posture when no external force acts on the leg portion,
 wherein when a stress acts on the leg portion from a front end side of the placement table toward a proximal end side thereof, the leg portion is configured to take the storage posture by the stress.

3. The sample rack as recited in claim 1,
 wherein when the sample rack is inserted into the sample storage, the leg portion takes the storage posture, so that the lower surface of the placement table comes into contact with a base configured to be cooled or heated in the sample storage to cool or heat the sample plate, and
 wherein when the sample rack is drawn out from the sample storage, the leg portion is configured to take the protruding posture.

4. The sample rack as recited in claim 1, further comprising
 a packing attached to a peripheral edge of a placement table side surface of the handle portion,
 wherein the packing is configured to keep airtightness of the rack insertion opening provided in a front panel of the sample storage by coming into contact with the front panel in a state in which the sample rack is inserted into the sample storage.

5. The sample rack as recited in claim 2,
 wherein the leg portion includes a main leg, an auxiliary leg, and a torsion spring that is an elastic member,
 wherein one end of the main leg is connected to the placement table by a first shaft and is rotatable within a vertical plane about the first shaft,
 wherein the other end of the main leg and one end of the auxiliary leg are connected by a second shaft and are rotatable mutually in a vertical plane with the second shaft as a rotation axis, and
 wherein the other end of the auxiliary leg is connected to a slide shaft slidably provided along a guide rail provided on the placement table so as to extend in a direction parallel to the upper surface of the placement table.

6. The sample rack as recited in claim 5,
wherein the torsion spring is provided so that one end side of the torsion spring is in contact with a first protrusion provided to the placement table and the other end side thereof is in contact with a second protrusion provided to the main leg so that an elastic force always acts on the main leg in a direction to open the main leg toward the front end side of the placement table, and
wherein when the main leg is rotated to a predetermined position by the elastic force of the torsion spring, the slide shaft reaches a termination portion of the guide rail, and the termination portion position of the guide rail is set such that the leg portion takes the protruding posture when the slide shaft reaches the termination portion of the guide rail.

7. The sample rack as recited in claim 5,
wherein when the sample rack is inserted into the sample storage from the front end side of the placement table, the front panel of the sample storage is brought into contact with the auxiliary leg and exerts a stress on the auxiliary leg toward the proximal end side of the placement table, causing the auxiliary leg to slide toward the proximal end side of the placement table by the stress, so that the other end of the main leg is rotated toward the proximal end side of the placement table.

\* \* \* \* \*